April 25, 1967
I. W. OSBURN ETAL
3,315,355
PIPE OR ROD CUTTING TOOL HAVING A DISC TYPE CUTTING WHEEL
AND TOGGLE MEANS TO MOVE SAID WHEEL IN AN OPERATIVE
OR INOPERATIVE POSITION
Filed March 29, 1965
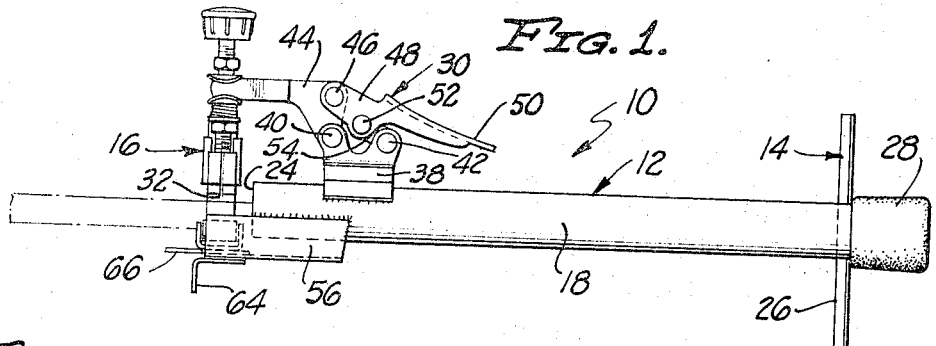
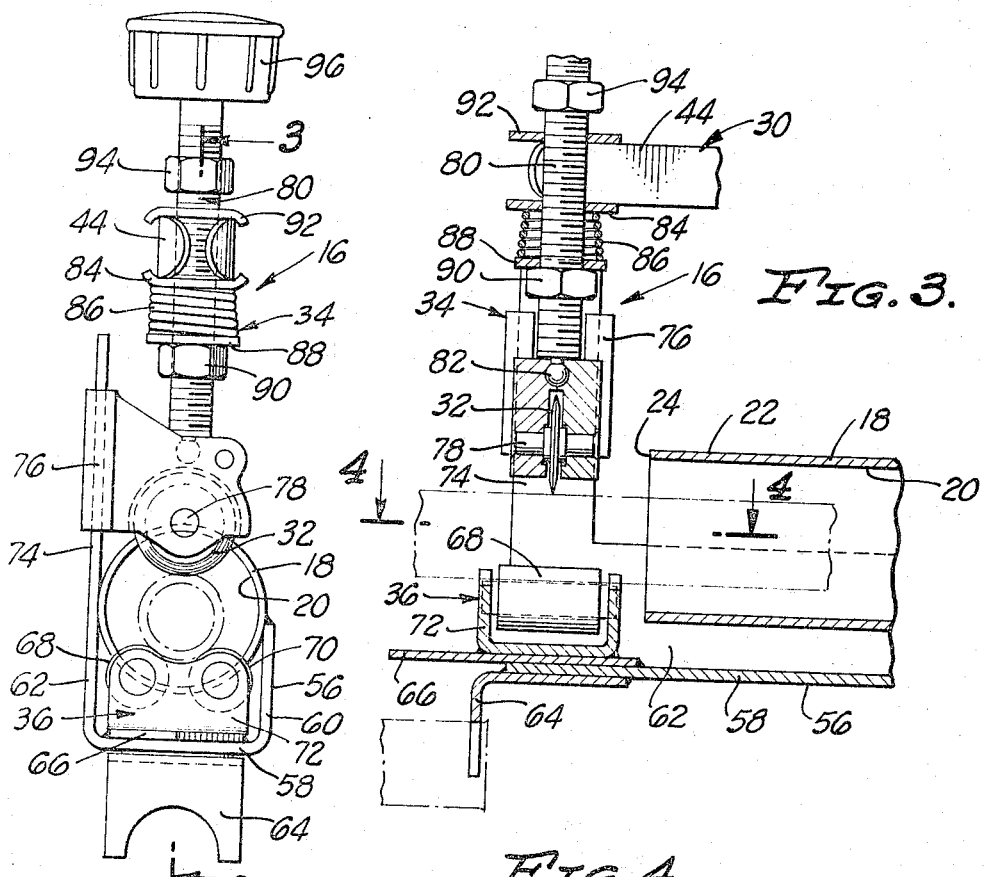
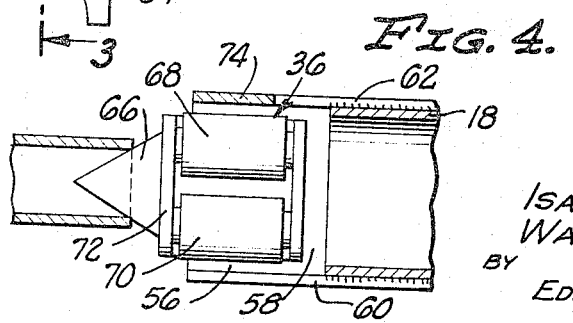
INVENTORS
ISAAC W. OSBURN,
WALTER E. OSBURN
BY
EDWARD D. O'BRIAN
ATTORNEY

# United States Patent Office 3,315,355
Patented Apr. 25, 1967

3,315,355
PIPE OR ROD CUTTING TOOL HAVING A DISC TYPE CUTTING WHEEL AND TOGGLE MEANS TO MOVE SAID WHEEL IN AN OPERATIVE OR INOPERATIVE POSITION
Isaac W. Osburn, 13720 Gardenland, Bellflower, Calif. 90706, and Walter E. Osburn, 11804 Ramrock Drive, La Mirada, Calif. 90638
Filed Mar. 29, 1965, Ser. No. 443,301
4 Claims. (Cl. 30—102)

This invention is directed to a long handled tube cutter particularly adapted to easily reach and cut tubes in restricted areas where such tube cutting is otherwise difficult or impossible. More specifically, this invention is directed to a long handled tube cutter which comprises a body structure, a drive structure and a tube cutting structure. The body structure in turn comprises an elongated tube which has an interior opening of sufficient diameter to accept a portion of the tube which the tube cutter is adapted to cut. The length of the interior opening is sufficient to accept a substantial length of the tube which the tube cutter is adapted to cut. The body structure has an elongated axis which is adapted to be positioned substantially parallel to the axis of the tube to be cut. The tubular body structure has first and second ends. Drive structure is attached to the first end of the tubular body structure. Tube cutting structure is attached to the body structure at its second end. The tube cutting structure comprises at least one tube cutting back-up roller mounted with respect to the body structure. The back-up roller is rotatable on an axis substantially parallel to the axis of the body structure. A cutting wheel is movably mounted with respect to the back-up roller. The cutting wheel is movable along a path at substantially right angles to the axis of the body structure and is rotatable on an axis which is substantially parallel to the axis of rotation of the roller. The tube cutting structure includes a toggle mounted on the body structure. The toggle has an operating handle extending toward the first end of the drive structure and a loading lever extending adjacent the tube cutting wheel. A spring positioned between the loading lever and the tube cutting wheel urges the cutting wheel toward the back-up roller upon actuation of the operating handle.

In modern day house building the studding is first installed and the water plumbing is installed in the studding. The water plumbing is arranged so that capped stub ends extend out of the walls at places where water utilization equipment is later to be installed. Copper tubing is the preferred modern pressure water conduit and caps are normally soldered to the extending stub ends of the copper tubing. These caps are installed to protect the entry of contaminants into the water tubing and to permit pressure testing of the installed system prior to the addition of wall covering.

After the house has been completed to a later stage, the wall covering is put in place and the pressure water utilization equipment is installed. It is then necessary to connect these stub ends to the water utilization equipment. Often times the capped stub ends are difficult to reach, for they are beneath sinks and underneath kitchen cabinets. In the past it was necessary to enter with a normal tube cutter and to make an attempt to reach the capped stub end in the difficult location and cut it to the proper length. This cutting prepares the tubing for the installation of a stop cock and for connection from the stop cock to the water utilization equipment. Such cutting is necessary to remove the soldered cap and is necessary to make the tubing length extending from the wall as uniform as possible.

Description

Accordingly, it is an object of this invention to provide a long handled tube cutter which can readily reach into otherwise inaccessible or difficult to reach tube cutting locations and properly cut the tube at the desired place.

It is another object of this invention to provide a long handled tube cutter which has a hollow drive tube so as to accept the end to be cut off.

It is another object of this invention to provide a tube cutter which has a toggle operated and spring loaded cutting wheel so that the cutting wheel may be easily engaged from a distance.

Other objects and advantages of this invention will become apparent from a study of the following portion of the specification, the claims and the attached drawings in which:

FIG. 1 is a side elevational view of the long handled tube cutter of this invention;
FIG. 2 is an enlarged left end elevational view thereof;
FIG. 3 is a section taken along the line 3—3 of FIG. 2, with parts broken away; and
FIG. 4 is a section taken along the line 4—4 of FIG. 3, with parts broken away.

This invention will be understood in greater detail by reference to the following portion of this specification wherein the drawings are described. Referring now to the drawings, the long handled tube cutter of this invention is generally indicated at 10. The long handled tube cutter 10 comprises body structure 12, drive structure 14 and tube cutting structure 16.

Body structure 12 comprises tube 18 which has a longitudinal axis and inner and outer walls 20 and 22, respectively. Furthermore, tube 18 has an end 24 adjacent the tube cutting structure 16 and an end adjacent the drive structure 14. The opening defined by inner wall 20 is sufficiently large to accept any size of tube which is designed to be cut by the tube cutter 10.

Drive structure 14 simply comprises cross bar 26 which is firmly positioned through suitable openings in tube 18 which are positioned at substantially right angles to the axis of tube 18. Rubber cap 28 is positioned over the end of tube 18 beyond cross bar 26 so that the tube cutter 10 may be pushed with the palm of the hand in the leftward direction as seen in FIG. 1. If desired, non-manual drive structure can be substituted for the cross bar 26.

Tube cutting structure 16 comprises toggle 30, the cutting wheel 32 and its support and spring loading structure generally indicated at 34, and wheel backup means 36.

Toggle 30 comprises a base bracket 38 which is secured to the exterior of tube 18 adjacent end 24. Bracket 38 has bearing holes therein for pivot pins 40 and 42. Loading lever 44 is pivoted on pin 40 and also carries pivot pin 46. Toggle closing handle 48 has a manually engageable handle element 50 and is pivoted on pivot pin 46. Toggle closing handle 48 carries pivot pin 52. Toggle link 54 is pivoted on pins 42 and 52. From the configurations seen in FIG. 1, it is clear that depression of handle 50, to the position shown in FIG. 1, moves the pin 52 below the straight line between the pins 42 and 46 to thus lock the toggle 30 in the position shown. Thus, loading lever 44 is locked in the position shown, and as is hereinafter described, loading lever 44 engages with further structure of tube cutting structure 16 to load the wheel 32 against the tube. Raising of handle element 50 moves pivot pin 52 above the center line of pivots 42 and 46 to unlock the toggle. Further upward movement of handle element 50, as seen in FIG. 1, draws the pivot pins 42 and 46 closer together so as to raise the left end of loading lever 44, to unload wheel 32 and raise it.

from this structure it can be seen that operation of handle element 50 controls loading lever 44.

As is best seen in FIGS. 2 and 3, tube cutting structure 6 includes wheel backup means 36. Wheel backup means 36 comprises channel 56 having web 58 and flanges 60 and 62. Flanges 60 and 62 extend away from the web and engage on the outside surface 22 of tube 18. They are rigidly secured thereto, such as by welding. Channel 56 extends beyond end 24 of tube 18 and carries thereon curved scraper 64 which is adapted to scrape dirt and burrs from the exterior of a tube of the nature which can be cut by the long handled tube cutter 10 of this invention. Furthermore, extending beyond the end of channel 56 is reamer 66. As is best seen in FIG. 4, reamer 66 is adapted for the reaming out to full diameter of the end of the tube which has been cut with the tube cutter 10 of this invention.

Also mounted upon channel 56 is wheel backup means 36. Wheel backup means is positioned just beyond the end 24 of tube 18, and is positioned across from wheel 32 so as to back up the tube being cut with respect to the force exerted by wheel 32. To accomplish this with minimum of friction, wheel backup means 36 comprises rollers 68 and 70 which are pivotally mounted in channel shape roller support 72. Rollers 68 and 70 are arranged with their axes of rotation parallel to the axis of tube 18.

As is best seen in FIGS. 2 and 3, flange 62 has a portion thereof extending upwardly to form guide bar 74. Guide bar 74 is of rectangular section and extends in a direction at right angles to the axis of tube 18. Cutting wheel carrier 76 embraces guide bar 74 so that carrier 76 is able to reciprocate along the length of the guide bar. Cutting wheel carrier 76 has a pivot pin 78 therethrough and this pivot pin carries cutting wheel 32. Pivot pin 78 has its axis parallel to the axis of tube 18, and thus parallel to the axes of rollers 68 and 70.

Thrust bar 80 is rotatably secured to roller carrier 76 by means of ball joint 82. Thrust bar 80 passes through an opening in loading lever 44. Washer 84 under loading lever 44 engages upon the top of spring 86, and spring 86 in turn engages upon washer 88 which is engaged upon nut 90. This construction is arranged so that when loading lever 44 is moved downward, it moves downward with respect to thrust bar 80 to compress spring 86. Spring 86 urges cutting wheel 32 against the tube to be cut so that cutting force is maintained. Washer 92 is positioned above loading lever 44 and is arranged to engage nut 94 when loading lever 44 is raised so as to move cutting wheel 32 away from rollers 68 and 70. Hand wheel 96 is arranged to rotate thrust bar 80 with respect to nut 90 so as to change the amount of compression of spring 86 and thus the amount of force applied by the cutting wheel 32 during cutting.

In operation, the long handle tube cutter 10 of this invention is brought to a tube. In preferable use, this tube is capped and is fixed within a building construction and is usually in a relatively inaccessible location. The tube cutter 10 is opened by raising handle element 50, is thrust upon the tube the desired distance, usually with a portion of the tube positioned within the interior of tube 18. Depression of handle element 50 operates toggle mechanism 30 so as to urge washer 84 downwardly, as is seen in FIGS. 2 and 3, to compress spring 86 and move cutting wheel carrier 76 down bar 74 until cutting wheel 32 is in contact with the exterior surface of the tube to be cut. Thereupon, the entire tube cutter 10 is rotated about the axis of the tube to be cut by operation of drive structure 14. This usually entails simple twisting by manual effort of the tube cutter 10 about this axis. As rotation continues, tube cutting continues because spring 86 maintains the cutting wheel 32 within the cut with an adequate force to cause cutting. After cutting is completed, the tube is reamed by means of reamer 66 and the exterior of the tube is cleaned by means of scraper 64. Thus, the tube is cut to the appropriate length with ease and convenience, even though the tube is in an inaccessible position.

This invention having been described in its preferred embodiment, it is clear that it is susceptible to numerous changes and embodiments within the scope of this invention and without the exercise of the inventive faculty. Accordingly, the scope of this invention is defined by the scope of the following claims.

We claim:

1. A long handled tube cutter, said long handled tube cutter comprising:

a body structure, a drive structure and a tube cutting structure;

said body structure comprising an elongated tube having an interior opening of sufficient diameter to be adapted to accept a portion of the tube which the tube cutter is adapted to cut, said interior opening being of sufficient length to accept a substantial length of the tube adapted to be cut, said tubular body structure having an elongated axis which is adapted to be positioned substantially parallel to the axis of the tube being cut, said tubular body structure having first and second ends;

said drive structure comprising drive means attached to said body structure adjacent said first end thereof;

said tube cutting structure being attached to said body structure adjacent said second end thereof, said tube cutting structure comprising at least one tube cutting backup roller mounted with respect to said body structure, said backup roller being rotatable on an axis substantially parallel to the axis of said body structure, a cutting wheel movably mounted with respect to said backup roller, said cutting wheel being movable along a path at substantially right angles to said axis and rotatable upon an axis substantially parallel to the axis of rotation of said roller;

said tube cutting structure including a toggle mounted upon said body structure, said toggle having an operating handle extending toward said drive structure and having a loading lever extending adjacent said tube cutting wheel, a spring positioned between said loading lever and said tube cutting wheel so that actuation of said manual handle moves said loading lever to spring urge said cutting wheel toward said backup roller.

2. The long handled tube cutter of claim 1 wherein a guide bar is mounted with respect to said body structure to extend substantially parallel to the path of travel of said cutting wheel, a cutting wheel carrier engaging said guide bar, said cutting wheel carrier being linearly movable with respect to said guide bar, said cutting wheel carrier rotatably carrying said cutting wheel.

3. The long handled tube cutter of claim 2 wherein a thrust bar is connected to said cutting wheel carrier, adjustment means on said thrust bar, said spring engaging said adjustment means and said loading lever so that movement of said loading lever urges said spring adjacent said adjustment means.

4. The long handled tube cutter of claim 3 wherein said spring is a compression spring and movement of said manually operable handle of said toggle to a locked toggle position compresses said spring.

References Cited by the Examiner

UNITED STATES PATENTS

| | | | |
|---|---|---|---|
| 860,711 | 7/1907 | Vosper | 30—94 |
| 1,118,349 | 11/1914 | Johnson | 30—102 |
| 2,025,105 | 12/1935 | Hillberg | 30—101 |
| 2,735,175 | 2/1956 | Tallman | 30—101 X |

WILLIAM FELDMAN, *Primary Examiner.*

M. C. KRUSE, *Examiner.*